United States Patent
Hall et al.

(10) Patent No.: US 8,672,177 B2
(45) Date of Patent: Mar. 18, 2014

(54) PORTABLE WASTE TRANSFER TANK

(75) Inventors: Kenneth Hall, Jackson, MI (US); Sheryar Durrani, West Bloomfield, MI (US)

(73) Assignee: Thetford Corporation, Ann Arbor, MI (US)

( * ) Notice: Subject to any disclaimer, the term of this patent is extended or adjusted under 35 U.S.C. 154(b) by 0 days.

(21) Appl. No.: 13/554,136

(22) Filed: Jul. 20, 2012

(65) Prior Publication Data

US 2012/0279975 A1  Nov. 8, 2012

Related U.S. Application Data

(63) Continuation of application No. 11/551,469, filed on Oct. 20, 2006, now Pat. No. 8,225,819.

(51) Int. Cl.
*B65D 6/40* (2006.01)
*B65D 45/00* (2006.01)
*E03B 11/00* (2006.01)

(52) U.S. Cl.
USPC ............................. 220/742; 220/244; 137/279

(58) Field of Classification Search
USPC .............. 220/244, 259.1, 783, 836, 810, 745; 4/321, 899; 137/279, 355.22–355.28
See application file for complete search history.

(56) References Cited

U.S. PATENT DOCUMENTS

| | | | | |
|---|---|---|---|---|
| 3,327,323 | A * | 6/1967 | Miller, Jr. | 4/342 |
| 6,047,736 | A * | 4/2000 | Chiocchio et al. | 137/899 |
| 6,129,117 | A * | 10/2000 | Eriksson | 137/899 |
| 6,515,836 | B2 * | 2/2003 | Ozue et al. | 360/313 |
| 2004/0112448 | A1 * | 6/2004 | Faahs | 137/899 |
| 2005/0072804 | A1 * | 4/2005 | Brown | 222/175 |
| 2007/0235096 | A1 * | 10/2007 | Nielsen | 137/899 |

* cited by examiner

*Primary Examiner* — Bryon Gehman
*Assistant Examiner* — Shawn Braden
(74) *Attorney, Agent, or Firm* — Harness, Dickey & Pierce, P.L.C.

(57) ABSTRACT

A includes a main body portion defining a waste holding chamber, a vent path extending from the waste holding chamber to atmosphere, and a float member. The float member is coupled to the tank for movement between a first position and a second position. The float member is movable from the first position to the second position in response to an increase in fluid level within the storage chamber. The vent passage remains open for venting the storage chamber when the float member is in the first position and is blocks the vent passage in the second position.

12 Claims, 5 Drawing Sheets

PORTABLE WASTE TRANSFER TANK

CROSS-REFERENCE TO RELATED APPLICATIONS

This application claims priority to U.S. Provisional Patent Application No. 60/837,034 filed 11 Aug. 2006 and U.S. patent application Ser. No. 11/551,469 filed 20 Oct. 2006, which applications are herein expressly incorporated by reference.

INTRODUCTION

Vehicles, including but not limited to recreational vehicles ("RVs" in the United States and "Caravans" in Europe), tractor trailers, airplanes, boats, trains, and the like, often incorporate sanitation systems for the comfort and convenience of the occupants. It is necessary to periodically empty such sanitation system. It is known in the pertinent art to provide a portable waste transfer tank for transfer waste from an on-board sanitation system to a disposal site.

A continuous need remains in the art for improvement relating to the transportation and disposal of waste from vehicle sanitation systems.

SUMMARY

The present teachings provide a vent assembly for a portable waste transfer tank. The vent assembly includes a base portion defining a vent passage for venting a storage chamber of the portable waste transfer tank. The vent assembly further includes a float member coupled to the base portion for movement between a first position and a second position. The float member is movable from the first position to the second position in response to an increase in fluid level within the storage chamber. The vent passage remains open for venting the storage chamber when the float member is in the first position and is blocks the vent passage in the second position.

The present teachings additionally provide a vent and level indicator assembly for a portable waste transfer tank. The vent and level indicator assembly includes a base portion defining a vent passage for venting a storage chamber of the portable waste transfer tank. The vent and level indicator assembly additional includes a level indicator coupled to the base portion for movement between a first position and a second position. The level indicator is operative to provide a visual indicator that a storage chamber of the portable waste transfer tank is substantially full when in the second position. The vent and indicator assembly further comprises a float member carried by the level indicator for movement with the level indicator such that an increased fluid level in the storage chamber moves the level indicator from the first position to the second position.

The present teachings further provide a portable waste transfer tank. The portable waste transfer tank includes a main body portion defining a waste holding chamber, a vent path extending from the waste holding chamber to atmosphere, and a float member. The float member is coupled to the tank for movement between a first position and a second position. The float member is movable from the first position to the second position in response to an increase in fluid level within the storage chamber. The vent passage remains open for venting the storage chamber when the float member is in the first position and is blocks the vent passage in the second position.

Further areas of applicability of the present invention will become apparent from the description provided hereinafter. It should be understood that the description and specific examples are intended for purposes of illustration only and are not intended to limit the scope of the invention.

DRAWINGS

The present teachings will become more fully understood from the detailed description, the appended claims and the following drawings.

DESCRIPTION OF VARIOUS ASPECTS

Figure 1:
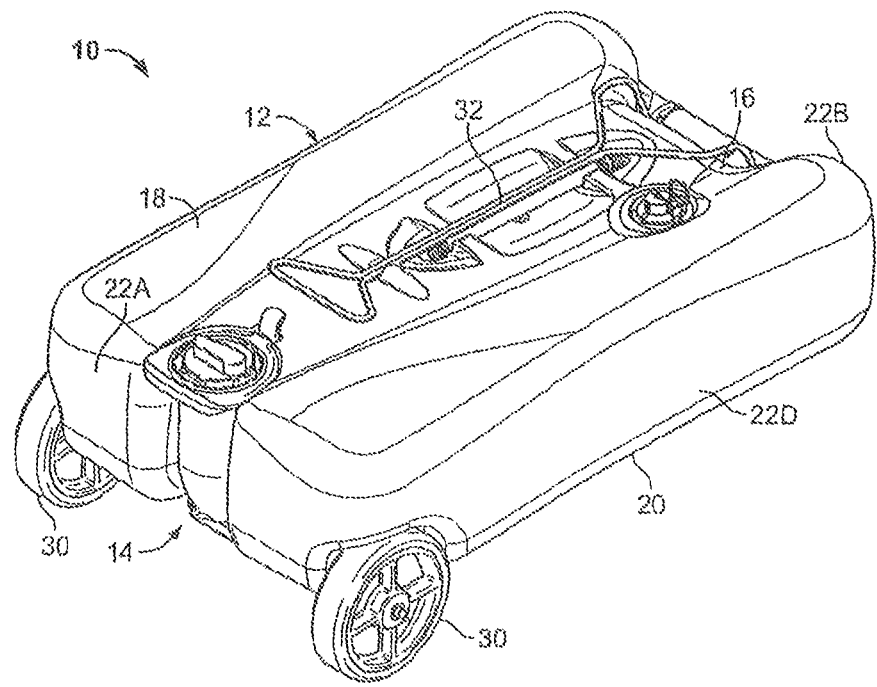
FIG. 1 is a perspective view of a portable waste transfer tank in accordance with the present teachings.

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure. Moreover, recitation of multiple embodiments having stated features is not intended to exclude other embodiments having additional features, or other embodiments incorporating different combinations of the stated features.

With general reference to the drawings, a portable waste transfer tank in accordance with the present teachings is generally identified at reference character 10. The portable waste transfer tank or waste holding tank 10 may be used in conjunction with recreational vehicle and other applications. For example, the portable waste transfer tank 10 may be used for the transfer of waste from an RV (motor coach or trailer) to a dumping or sewage site. It will become apparent to those skilled in the art after reading the remaining detailed description that various teachings of the present invention have application beyond such an exemplary use.

As generally shown in the drawings, the portable waste transfer tank 10 may generally include a main body portion 12, a hose assembly 14 and a vent and level indicator assembly 16. The main body portion 12 may be blow molded, roto-molded or injection molded of a plastic material or alternatively constructed of other materials having suitable strength and durability characteristics. The main body portion 12 may have a generally overall rectangular shape with a top wall 18, a bottom wall 20 and sidewalls. The sidewalls include a front wall 22A, a rear wall 22B and a pair of lateral spaced walls 22C and 22D extending between the rear wall 22A and the front wall 22B.

The main body portion 12 of the holding tank 10 may integrally define a handle portion 24. In this regard, the forward end 22B of the holding tank 10 may define a handle or handle portion 24 positioned proximate an opening 26. The handle portion 24 may be grasped by a user to facilitate transportation of the portable waste transfer tank 10.

The main body portion 12 defines an interior chamber for the temporary receipt of waste in a manner to be addressed below. The internal capacity of the main body portion 12 of the holding tank 10 may be varied for particular applications. In certain applications, the capacity of the main body portion 12 may range from approximately 6 gallons to approximately 32 gallons.

While smaller holding tank sizes (and to a greater extent, empty holding tanks) may generally be transported by manual lifting and carrying with the handle 24, the portable waste holding tank 10 may additionally incorporate a set of wheels 30 and a handle 32. As will become apparent below, the wheels 30 and the handle 32 cooperate to allow the user to pull the holding tank 10. In this manner, the weight of the holding tank 10 need only be balanced over two or more of the wheels 30 as the user pulls the holding tank 10 from the vehicle to a sewage disposal site.

Figure 2:
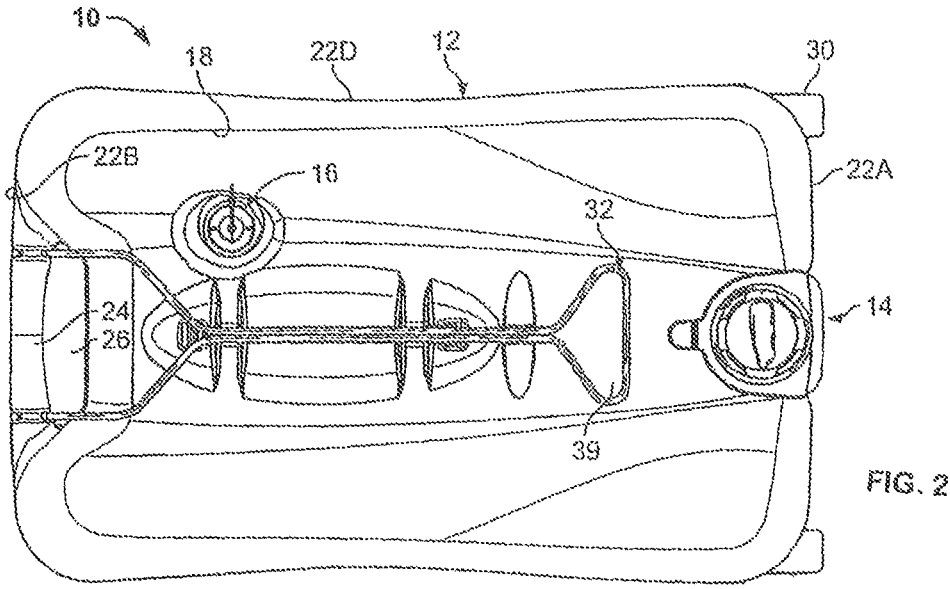
FIG. 2 is a top view of the portable waste transfer tank in accordance with the present teachings.
Figure 3:
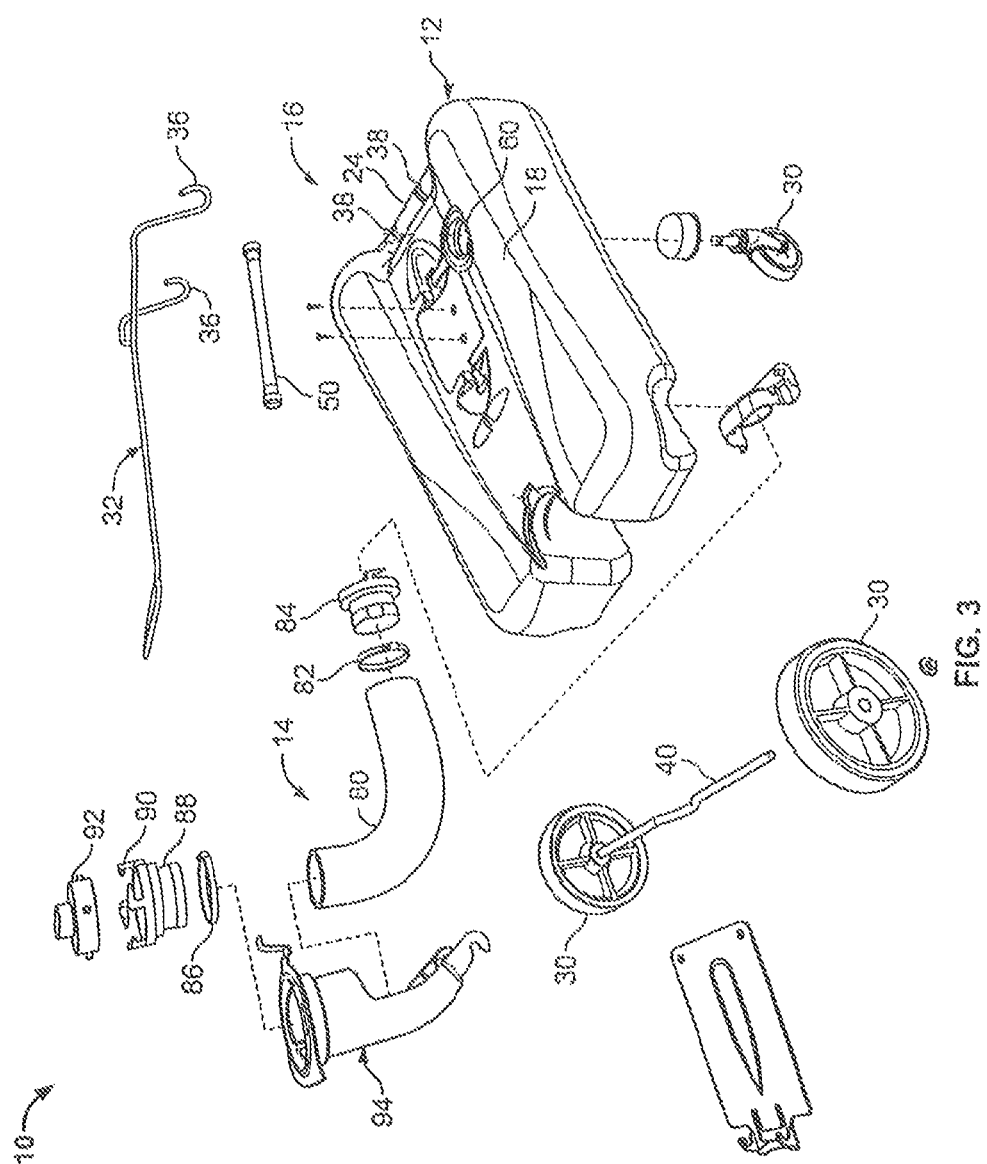
FIG. 3 is an exploded view of the portable waste transfer tank in accordance with the present teachings.

The handle 32 is perhaps best shown in FIGS. 2 and 3. The handle 32 may be articulated from a stored position to a deployed position. The stored position is shown in FIG. 2. The handle 32 may be formed from a continuous metal wire. In this regard, the handle 32 may include two ends 36 curved for rotatably engaging the handle 24 integrally formed with the main body portion 12. For example, the curved ends 36 may engage reduced diameter grooves 38 defined by the handle 24. The ends 36 may be retained to the handle 24 through a snap fit relationship or otherwise. The handle 32 may further include a loop portion 39 to be grasped by the user. The top side 18 of the main body portion 12 may be formed to include retention features for snap fit retention of the handle 32.

A pair of the wheels 30 may be mounted to the holding tank 10 for rotation about a common axis proximate the rear side 22A of the main body portion 12. As shown in the top view of FIG. 2, the wheels 30 proximate the rear side 22A do not substantially extend beyond the rear side 22A of the holding tank 10. The wheels 30 may be carried on a common axle 40. The common axle 40 may be snap fit or otherwise secured to the main body portion 12. The axle 40 may be fixed in this manner to the main body portion 12 and the associated wheels 30 may be mounted for relative rotation on the ends of the common axle 40. Alternatively, these wheels 30 may be mounted on independent axles extending from the main body portion 12 or perhaps integrally formed with the main body portion 12.

The wheels 30 associated with the common axle 40 may be at least partially disposed within recessed portions 42 of the main body portion 10 such that these wheels 30 do not downwardly extend substantially beyond the bottom side 20 of the holding tank 10. Furthermore, these wheels 30 do not laterally extend substantially beyond the lateral sides 22C and 22D of the holding tank 10. In this manner, the wheels 30 do not interfere with insert into or removal from the holding tank 10 from the vehicle. Additionally, the wheels 30 only negligibly impact the holding capacity of the holding tank 10. The wheels 30 and their associated interconnection to the holding tank 10 are designed such that failure of the wheels will not cause a rupture of the cavity defined by the holding 10.

The set of wheels may additionally include a forward wheel or caster 30. As illustrated, a single wheel or caster 30 may be positioned proximate the forward side 22B of the main body portion 12. Alternatively, the holding tank 10 may incorporate a pair of wheels or casters 30 proximate the forward side 22B of the main body portion 22B or a double wheel caster. Such forward wheels cooperate with the rear wheels for supported the holding tank 10 in a substantially horizontal position, as shown in FIG. 1, for example. The forward wheel 30 may engage an aperture in the main body portion 12 in a conventional snap fit relationship.

The holding tank 10 may additionally include a flexible rinse tube 50. As shown in FIG. 3, the flexible rinse tube 50 may be removably mounted to the upper side 18 of the main body portion 12.

Figure 4:
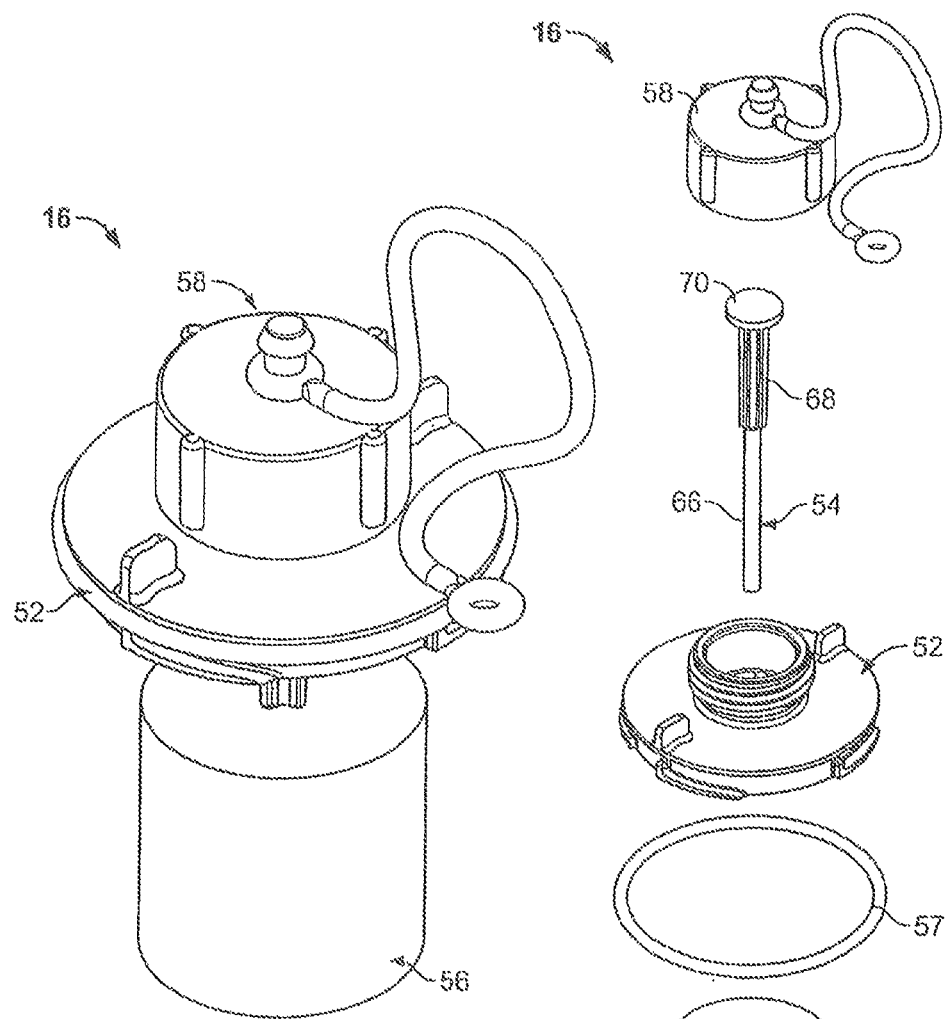
FIG. 4 is a perspective view of a vent and level indicator assembly in accordance with the present teachings.
Figure 5:
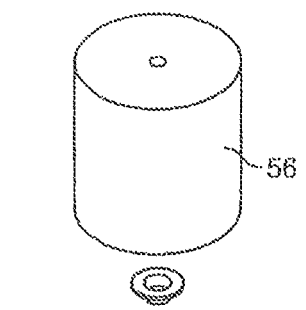
FIG. 5 is a perspective view of the vent and level indicator assembly in accordance with the present teachings.

With particular reference to FIGS. 4 and 5, the vent and level indicator assembly 16 may generally include a base portion 52, a level indicator 54, a float member 56 and a vent cap 58. The base portion 52 may be constructed of plastic or other suitable material and is configured to engage an opening 60 in the upper side 18 of the main body portion 12. Engagement may be with bayonet lugs, threads or any other manner well known in the art. A seal 57 may be positioned between the base portion 52 and the main body portion 12. Alternatively, the base portion 52 may be integrally formed with the remainder of the tank 10.

The base portion 52 may define an upwardly extending cylindrical flange 62. The flange 62 may be externally threaded for receiving corresponding threads of the vent cap 58. The vent cap 58 may be tethered by a flexible cord 59 to an upwardly extending boss portion 64 (shown in FIG. 5D, for example) extending from or integrally formed with the base portion 52.

The level indicator 54 may generally include a lower shaft portion 66, an upper shaft portion 68, and an enlarged head 70. The upper shaft portion 68 may have a diameter larger than the lower shaft portion 66 and may be slidably positioned in a cylindrical opening 72 defined by the base portion 52. The enlarged head 70 may have a diameter larger than the diameter of the cylindrical opening 72. The float member 56 may be carried by the lower shaft portion 66.

Figure 5A:
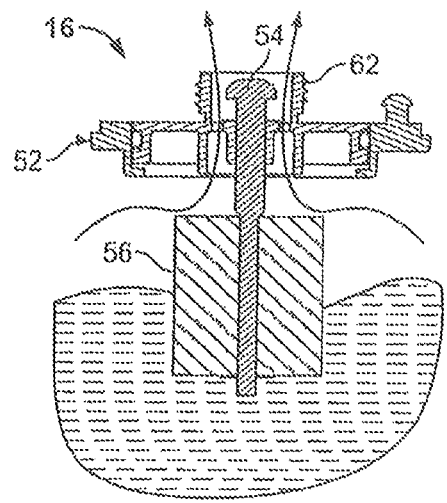
FIG. 5A is a cross-sectional view of the vent and level indicator assembly in accordance with the present teachings shown with the vent open.

With particular reference to the cross-sectional view of FIG. 5A, the vent and level indicator assembly is shown in a normal venting mode prior to the holding tank 10 substantially reaching its capacity limits. In this position, the float member 56 is spaced from a lower surface of the base member 52 and the internal cavity of the holding tank 10 is permitted to vent to the atmosphere. The venting paths are indicated by the arrows in FIG. 5A.

Figure 5B:
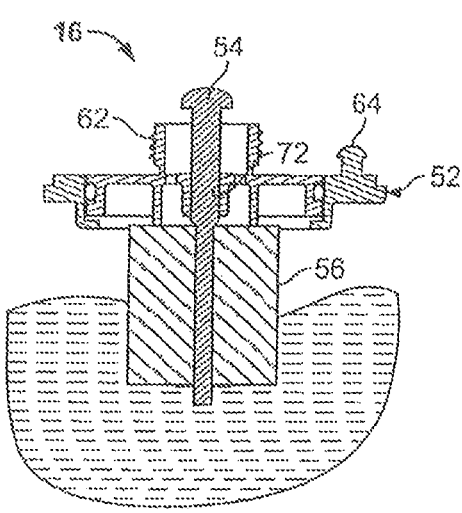
FIG. 5B is a cross-sectional view of the vent and level indicator assembly in accordance with the present teachings shown with the vent closed and the level indicator moved to an activated position.

Turning to the cross-sectional view of FIG. 5B, the vent and level indicator assembly 16 is shown with the holding tank 10 near its capacity limits. In this position, the float member 56 abuts the lower surface of the base member 52 and the internal cavity of the holding tank 10 is prevented from venting to the atmosphere. The venting paths indicated by the arrows in FIG. 5A are now closed. Upward advancement of the float member 56 similarly translates the enlarged head 70 of the level indicator 54 upward so as to indicate a full or substantially full condition of the holding tank 10. In this condition, the contents of the holding tank 10 can no longer exit the vent and level indicator assembly 16 and the introduction of further waste material into the holding tank 10 will not be accepted.

Figure 5C:
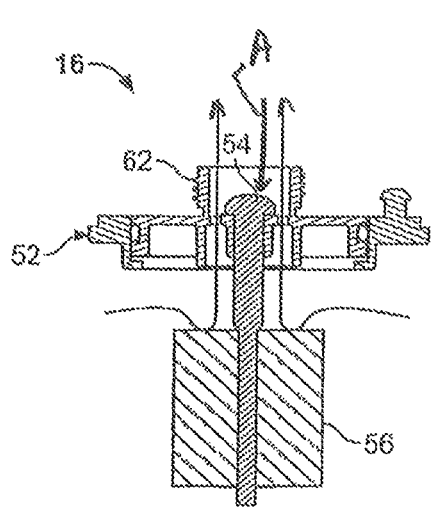
FIG. 5C is a cross-sectional view of the vent and level indicator assembly in accordance with the present teachings shown with the vent purged.

After the holding tank 10 has reached a substantially full condition (as shown in FIG. 5B), the level indicator 54 may be manually translated in a downward direction. This manually translation is represented in the cross-sectional view of FIG. 5C. Arrow A in FIG. 5C is representative of a manually applied force. Such translation of the level indicator 54 forces the float member 56 to separate from the bottom surface of the base member 52. In this manner, the venting passages through the base member 52 are again established and the holding tank 10 is effectively "burped". This action allows waste remaining in holding tank lines to enter the holding tank 10.

Figure 5D:
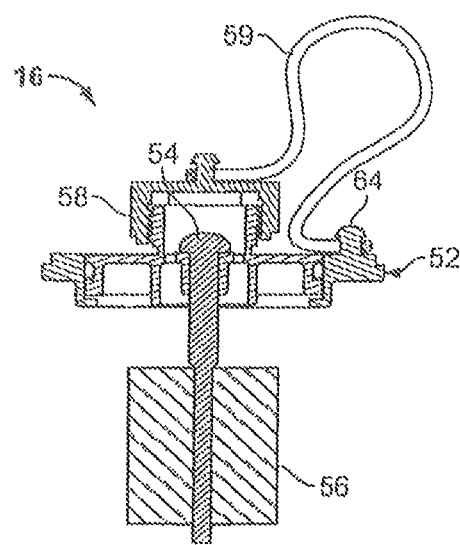
FIG. 5D is a cross-sectional view of the vent and level indicator assembly in accordance with the present teachings shown with the vent capped for transporting the portable waste holding tank.

With reference to the cross-sectional view of FIG. 5D, the vent and level indicator assembly 16 is shown with the vent cap 58 secured to the base member 52. Regardless of the position of the float member 56 relative to the base member 52, the venting passages are now closed. The holding tank 10 can now be transported without the threat of material exiting the vent and level indicator assembly 16. In this position, the vent cap 58 may include a portion which engages the head 70 and prevents the head 70 from translating upwardly.

With reference to the exploded view of FIG. 3 and FIGS. 6A-6C, the hose assembly 14 is shown to generally include a flexible hose 80. The flexible hose 80 is secured to a bottom fill point of the holding tank 10 with a hose clamp 82 and conventional bayonet flange 84. The bottom fill point of the holding tank allows access to a variety of waste outlet heights. The opposite end of the flexible hose 80 includes a hose clamp 86, a hose fitting 88, a bayonet fitting 90 and a dump cap 92.

Figure 6A:
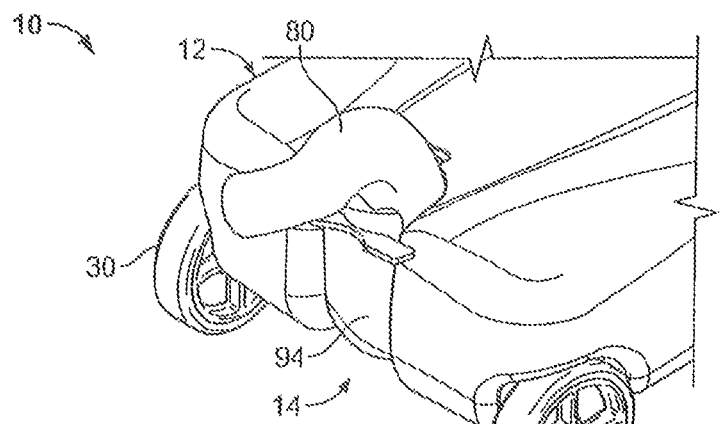
FIG. 6A is a perspective view of a portion of the portable waste transfer tank in accordance with the present teachings, a hose shown in an extended position.
Figure 6B:
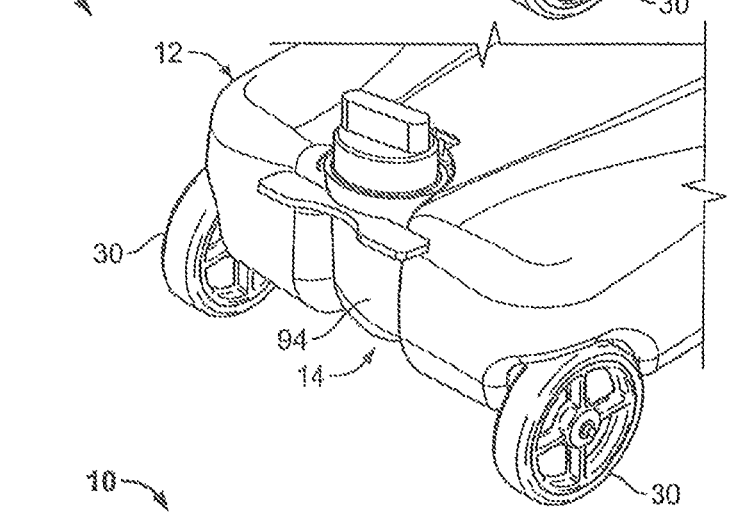
FIG. 6B is cross-sectional view similar to FIG. 6A illustrating the hose in a stored position and capped.
Figure 6C:
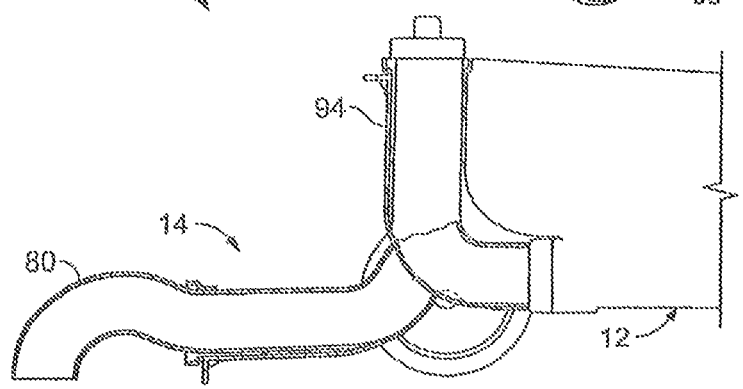
FIG. 6C is another cross-section view similar to FIG. 6A illustrating the hose in an extended position and a hose support member articulated to a lower position.

The hose assembly 14 may include a hose support member 94. The hose support member 94 may function to guide and support the flexible hose 80. The hose support member 94 may be constructed of metal or other suitable material and may be coupled to the main body portion 12 of the holding tank 12 for rotation between a stored position and an extended position. The stored position is shown, for example, in FIGS. 6A and 6B. FIG. 6A particularly shows a filling position when the tank 10 is connected to a holding tank. The extended position is shown, for example, in FIG. 6C. In the extended position, the hose support member 94 may be used to support and guide the flexible hose 80 for emptying the holding tank 10 into a sewage system.

While specific examples have been described in the specification and illustrated in the drawings, it will be understood by those skilled in the art that various changes may be made and equivalence may be substituted for elements thereof without departing from the scope of the present teachings. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description.

What is claimed is:

1. A portable waste transfer tank comprising:
   a holding tank defining an internal cavity;
   a flexible hose directly coupled to the holding tank and in fluid communication with the internal cavity; and
   a hose support member directly coupled to the holding tank for rotation between a stored position and an extended position, the hose support member at least partially surrounding the flexible hose in a circumferential direction and operative to guide and support the flexible hose;
   wherein the holding tank defines a recess at an end thereof, the recess extending from a top surface of the holding tank to a bottom surface of the holding tank, an upper portion of the hose support member circumferentially surrounding the flexible hose and positioned in the recess when the hose support member is in the stored position and rotated from the recess in the extended position.

2. The portable waste transfer tank of claim 1, wherein the hose support member guides at least a portion of the flexible hose for movement between the stored position and the extended position within a plane.

3. The portable waste transfer tank of claim 1, wherein the hose support member extends vertically in the stored position and horizontally in the extended position.

4. The portable waste transfer tank of claim 1, wherein the hose support member includes a first end defining a hooked portion.

5. The portable waste transfer tank of claim 4, wherein the hooked portion rotatably couples to the holding tank.

6. The portable waste transfer tank of claim 4, wherein the hose support member includes an opposite second end tubular in shape and a flange extending radially therefrom, the flange defining a support surface.

7. The portable waste transfer tank of claim 1, wherein the hose support member is constructed of metal.

8. A portable waste transfer tank comprising:
   a holding tank defining an internal cavity, the holding tank defining a recess at an end thereof, the recess extending from a top surface of the holding tank to a bottom surface of the holding tank;
   a flexible hose directly coupled to the holding tank proximate both the recess of the holding tank and the bottom surface of the holding tank, the flexible hose in fluid communication with the internal cavity; and
   a hose support member including a first end directly coupled to the holding tank, the hose support member rotatable relative to the holding tank between a stored position and an extended position, the hose support member at least partially surrounding the flexible hose in a circumferential direction and operative to guide and support the flexible hose;
   wherein a second end of the hose support member circumferentially surrounds the flexible hose and is positioned in the recess when the hose support member is in the stored position and rotated from the recess in the extended position.

9. The portable waste transfer tank of claim 8, wherein the hose support member guides at least a portion of the flexible hose for movement between the stored position and the extended position within a plane.

10. The portable waste transfer tank of claim 8, wherein the hose support member extends vertically in the stored position and horizontally in the extended position.

11. The portable waste transfer tank of claim 8, wherein the first end of the hose support member defines a hooked portion.

12. The portable waste transfer tank of claim 11, wherein the hooked portion rotatably couples to the holding tank.

* * * * *